United States Patent Office 3,145,145
Patented Aug. 18, 1964

3,145,145
MAGNESIA AND GOLD TEMPERATURE
TELLTALE INDICATORS
Solomon Reznek and William G. Gorman, Albany, N.Y., assignors to Sterling Drug Inc., New York, N.Y., a corporation of Delaware
No Drawing. Filed Dec. 19, 1960, Ser. No. 76,460
7 Claims. (Cl. 167—78)

This invention relates to a novel method and a new article of manufacture serving to indicate whether goods have been subjected to freezing temperatures.

As is well known, some classes of goods may be damaged substantially or even ruined by exposure to freezing temperatures, that is to say, temperatures of zero degrees centigrade and below. If the goods after exposure to freezing temperatures return with reestablishment of temperature conditions above freezing to substantially their normal physical appearance, that is, so that they look substantially the same as they did before the exposure to freezing temperatures, there is under ordinary circumstances a hazard that the exposure to freezing temperatures may occur undetected. This is particularly true if the exposure has occurred after the goods are packaged for storage or shipping. Thus, the damaged or defective goods may be unwittingly employed, with consequent undesirable results; or, alternatively, expensive and time-consuming routine tests may be required to confirm that the goods have not in fact been exposed to freezing temperatures.

It is an object of the present invention to provide simple, convenient, and reliable means for indicating whether or not goods as referred to above have remained free of exposure to freezing temperatures until ready for use.

In one aspect, our invention resides in the concept of the following method of providing means for indicating whether goods which after exposure to freezing temperatures return with reestablishment of temperature conditions above freezing to substantially their normal physical appearance have become subjected to freezing temperatures. Our new method comprises including with the said goods under comparable exposure to atmospheric temperature conditions a container having therein an aqueous colloidal sol subject to loss of its colloidal character when exposed to freezing temperatures.

The new article of manufacture of this invention consists of a package comprising (a) goods which after exposure to freezing temperatures return with reestablishment of temperature conditions above freezing to substantially their normal physical appearance and (b), in a container separate from but adjacent to said goods and under comparable exposure to atmospheric temperature conditions, an aqueous colloidal sol subject to loss of its colloidal character when exposed to freezing temperatures.

To practice our new method of arranging for an indication of exposure of goods to freezing conditions, one or more containers of an aqueous colloidal sol are included with the goods in any suitable fashion such that the sol and the goods are under comparable exposure to atmospheric temperature conditions. We ordinarily prefer to use two containers of the sol, placing these on opposite sides of and adjacent to the goods to be stored or shipped; however, as will be appreciated, as many containers of the sol as desired can be employed.

The container for the sol can be any closed vessel but, for convenience of examination, transparent containers such as bottles, tubes, or vials of colorless glass or clear plastic are preferred. The volume of these containers is not critical, and instead convenience and economy are the primary factors involved. We have found that vials of 1 to 10 ml. capacity are fully satisfactory under ordinary circumstances, since a 1 to 10 ml. portion of the aqueous colloidal sol is sufficiently large to permit simple and convenient visual inspection to ascertain whether the colloidal character of the sol has been lost or has been retained.

The aqueous colloidal sols useful in the practice of our invention are an old and well-known class wherein a solid in colloidal form is suspended in an aqueous medium which in addition to water may include one or more suspension aids. Such sols, which have freezing points which are not substantially different from that of water itself, lose their colloidal character when frozen and, on thawing, the solid settles out of suspension as a precipitate. Thus, it can be determined by simple visual inspection whether on the one hand the sol, and hence also the accompanying goods, have remained in the unfrozen state, as evidenced by the fact that the sol has retained its characteristic colloidal nature; or whether, on the other hand, the sol and the accompanying goods have been subjected to freezing temperatures, as evidenced by separation of the solid from suspension in the sol due to loss of colloidal character.

The preferred aqueous colloidal sols are gold sols and milk of magnesia. These sols have proved to be highly satisfactory in the practice of our invention. The milk of magnesia has the advantage of being particularly economical and showing a readily visible deposit of particles when thawed after being frozen. In the case of the gold sol, the color change involved is more readily detected visually than is the separation of solid. Thus, whereas the gold sol is colored red, pink, purple or blue, depending on the size of the colloidal particles therein, when the colloidal character of the sol is lost the aqueous suspending medium becomes colorless.

Our invention is especially useful in connection with the shipping and storage of biological products, for instance suspensions of sporulated oocysts of coccidia in dilute (e.g., one to four percent) aqueous potassium dichromate solution. For example, such suspensions of viable sporulated oocysts of various species of the genus Eimeria, for instance *Eimeria tenella*, are used as oral poultry vaccines. After freezing, these vaccines return with reestablishment of temperature conditions above freezing to substantially their normal physical appearance; but despite their appearance the effectiveness of the vaccines is seriously affected adversely by the freezing because all or a substantial proportion of the sporulated oocysts are killed. Thus, unless some method of detection of the exposure to freezing has been employed, it is necessary to test the vaccine, for instance by biological tests, to guard against the undesirable results of employing defective vaccine. In accordance with the instant invention, by including one or more containers of an aqueous colloidal sol, such as milk of magnesia or a gold sol, with the stored or shipped packages of vaccine, examination of the sol at any time subsequent to the storing or shipping provides simple, convenient, and reliable indication of whether the vaccine has meanwhile been exposed to freezing temperatures.

We claim:
1. The method of providing means for indicating whether goods which after exposure to freezing temperatures return with reestablishment of temperature conditions above freezing to substantially their normal physical appearance have become subjected to freezing temperatures which comprises including with the said goods under comparable exposure to atmospheric temperature conditions a container having therein an aqueous colloidal sol subject to loss of its colloidal character when exposed to freezing temperatures, said aqueous colloidal sol being a member of the class consisting of gold sols and milk of magnesia.

2. The method in accordance with claim 1 wherein the aqueous colloidal sol is milk of magnesia.

3. The method in accordance with claim 1 wherein the aqueous colloidal sol is a gold sol.

4. As an article of manufacture, a package comprising (a) goods which after exposure to freezing temperatures return with reestablishment of temperature conditions above freezing to substantially their normal physical appearance and (b), in a container separate from but adjacent to said goods and under comparable exposure to atmospheric temperature conditions, an aqueous colloidal sol subject to loss of its colloidal character when exposed to freezing temperatures, said aqueous colloidal sol being a member of the class consisting of gold sols and milk of magnesia.

5. As an article of manufacture, a package comprising (a) a suspension of viable sporulated oocysts of a species of the coccidial genus Eimeria in a dilute aqueous posassium dichromate solution and (b), in a container separate from but adjacent to said suspension and under comparable exposure to atmospheric temperature conditions, an aqueous colloidal gold sol subject to loss of its colloidal character when exposed to freezing temperatures.

6. An article of manufacture in accordance with claim 4 wherein the aqueous colloidal sol is milk of magnesia.

7. An article of manufacture in accordance with claim 4 wherein the aqueous colloidal sol is a gold sol.

References Cited in the file of this patent

UNITED STATES PATENTS

| | | |
|---|---|---|
| 2,892,798 | Dobbs et al. | June 30, 1959 |
| 2,971,852 | Schulein | Feb. 14, 1961 |

OTHER REFERENCES

Remington: Practice of Pharmacy, 1956, p. 180 and p. 489.

Encyclopaedia Britannica, vol. 6, 1957, pp. 22–29.